US012647022B2

(12) United States Patent　　　　(10) Patent No.: US 12,647,022 B2
Kopejtko　　　　　　　　　　　　(45) Date of Patent:　　　Jun. 2, 2026

(54) PRECHARGE DEVICE FOR DC LOADS INCLUDING A SWITCHING ELEMENT AND A MAGNETIC CORE

(71) Applicant: Eaton Intelligent Power Limited, Dublin (IE)

(72) Inventor: Petr Kopejtko, Czechia (CZ)

(73) Assignee: EATON INTELLIGENT POWER LIMITED, Dublin (IE)

( * ) Notice: Subject to any disclaimer, the term of this patent is extended or adjusted under 35 U.S.C. 154(b) by 144 days.

(21) Appl. No.: 18/690,425

(22) PCT Filed: Sep. 8, 2022

(86) PCT No.: PCT/EP2022/025418

§ 371 (c)(1),
(2) Date: Mar. 8, 2024

(87) PCT Pub. No.: WO2023/036466

PCT Pub. Date: Mar. 16, 2023

(65) Prior Publication Data

US 2024/0380309 A1　　　Nov. 14, 2024

(30) Foreign Application Priority Data

Sep. 13, 2021　　(GB) ...................................... 2113050

(51) Int. Cl.
H02M 1/36　　　　(2007.01)
H02M 1/32　　　　(2007.01)
(52) U.S. Cl.
CPC .............. H02M 1/36 (2013.01); H02M 1/32 (2013.01)
(58) Field of Classification Search
CPC ................................ H02M 1/36; H02M 3/335
See application file for complete search history.

(56) References Cited

U.S. PATENT DOCUMENTS

| 3,863,128 | A | 1/1975 | Wilwerding | |
| 11,159,091 | B2 * | 10/2021 | Divan ................. | H02M 1/4216 |
| 2007/0210765 | A1 * | 9/2007 | Ming-Ching ..... | H02M 3/33576 |
| | | | | 323/222 |
| 2016/0373016 | A1 * | 12/2016 | Vilhunen .......... | H02M 3/33576 |

FOREIGN PATENT DOCUMENTS

| DE | 10 2016 007000 A1 | 2/2017 |
| EP | 3 678 280 A1 | 7/2020 |

OTHER PUBLICATIONS

H. Byden and A Lundstrom "DC-DC capacitor precharger". Report 5452. (Year: 2020).*

* cited by examiner

*Primary Examiner* — Peter M Novak
(74) *Attorney, Agent, or Firm* — LEYDIG, VOIT & MAYER, LTD.

(57)　　　　ABSTRACT

A precharge device for DC loads comprising a switching element, a magnetic core with negatively coupled coils being switchably connected by the switching element. Moreover, the precharge device comprises capacitors with parallel diodes between the coils and ground with the forward directions pointing away from ground. In addition, the precharge device comprises a control for turning the switching element on if a total current through the coils or the absolute value of the total current drops below a first threshold value and for turning it off if it rises above a higher second threshold value. The invention also relates to an arrangement with such a precharge device a DC-grid connected to the precharge device and a load capacitor connected to the precharge device.

11 Claims, 6 Drawing Sheets

PRECHARGE DEVICE FOR DC LOADS INCLUDING A SWITCHING ELEMENT AND A MAGNETIC CORE

CROSS-REFERENCE TO RELATED APPLICATIONS

This application is a national phase filing under 35 C.F.R. § 371 and claims priority to PCT Patent Application No. PCT/EP2022/025418, filed on Sep. 8, 2022, which claims benefit to priority to United Kingdom Patent Application No. 2113050.5, filed on Sep. 13, 2021, which is incorporated herein in its entirety by reference.

TECHNICAL FIELD

The invention relates to a precharge device for precharging DC loads like capacitors which comprises a first positive terminal, a second positive terminal, a first ground terminal and a second ground terminal. The invention also relates to an arrangement, comprising a precharge device of the above kind, a DC-grid with its positive polarity being connected to the first positive terminal of the precharge device and with its ground potential being connected to the first ground terminal of the precharge device and a load capacitor with its positive polarity being connected to the second positive terminal of the precharge device and with its ground potential being connected to the second ground terminal of the precharge device.

BACKGROUND ART

A precharge device and an arrangement of the above kind are known in principle. Capacitors, in particular filtering capacitances for example in converters, and other energy storages on a load side of a DC grid may cause problems in transition phases between different operating states, in particular when power is switched on. High inrush currents may occur what may cause problems and even damage of components in the current path without taking measures against that. In particular, an overcurrent condition in a circuit breaker in the current path can be caused, which in turn leads to disconnection from the DC grid.

Although there are solutions to limit the inrush current, they are not fully satisfactory. There is a need of a simple solution with a low number of active components which itself does not cause a substantial inrush current, is suitable for inductances on the load side as well and does not need snubber circuits with MOVs (metal-oxide varistor).

DISCLOSURE OF INVENTION

Accordingly, an object of the invention is the provision of an improved precharge device and an improved arrangement with such a precharge device. In particular, a solution shall be proposed, which provides a simple solution with a low number of active components which itself does not cause a substantial inrush current, which is suitable for inductances on the load side as well and does not need snubber circuits with MOVs (metal-oxide varistor).

The object of the invention is solved by a precharge device, which comprises a first positive terminal, a second positive terminal, a first ground terminal, a second ground terminal connected to the first ground terminal, at least one switching element, a magnetic core, which is ring-shaped or at least comprises a ring-shaped section, a first coil wound around the magnetic core and a second coil wound around the magnetic core. A first end of the first coil is connected to the first positive terminal and a first end of the second coil is connected to the second positive terminal. Moreover, the second end of the first coil is connected to the second end of the second coil via the at least one switching element. The first coil and the second coil are negatively coupled what means that a first current flowing into the first end of the first coil and a second current flowing out of the first end of the second coil generate magnetic fluxes in opposite direction senses in the ring-shaped magnetic core or in the ring-shaped section of the magnetic core. In addition, the precharge device comprises a first capacitor between the second end of the first coil and the first ground terminal and a second capacitor between the second end of the second coil and the second ground terminal. Moreover, the precharge device comprises a first diode between the second end of the first coil and the first ground terminal as well as a second diode between the second end of the second coil and the second ground terminal. The forward direction of the first diode is from the first ground terminal to the second end of the first coil, and the forward direction of the second diode is from the second ground terminal to the second end of the second coil. Further on, the precharge device comprises a control for turning the at least one switching element on if a total current, which is the sum of the first current and the second current, or the absolute value of the total current drops below a first threshold value and for turning the at least one switching element off if said total current or its absolute value rises above a higher second threshold value.

Moreover, the object of the invention is solved by an arrangement of the kind disclosed in the opening paragraph, wherein the precharge device is designed as outlined above.

The proposed precharge device offers a number of advantages:

There is just a low number of active components. In fact, in one embodiment there is just one switching element in the current path of the proposed precharge device.

The control of the proposed precharge device can be based on simple rules. In fact, in one embodiment just the on/off state of a single switching element has to be controlled. It is even possible that an analog control is used.

The proposed precharge device itself does not cause (substantial) inrush currents because it does not need filtering capacitors.

The proposed precharge device without limitation can be used in cases where are substantial inductors on the grid side (source side).

There is no need for special design of snubber circuits with MOVs under normal circumstances (i.e. in case that the grid inductance does not reach extraordinary values. However, if there is the necessity for an MOV, it is switched in parallel with the first and/or second capacitor).

The special design of the proposed precharge device allows to control current in both directions.

The basic intention of the proposed device is precharging energy storages in a DC grid, e.g. capacitances. That is why the device may be seen as and termed as a "precharge device" To avoid overcurrent in the grid, the proposed device limits the current flowing into said energy storages. Accordingly, the proposed device may also be seen as and denoted as "current limiting device". It should also be noted that although the proposed device preferably is used for loading energy storages in a DC grid, alternative applications, where the device more relates to its current limiting function, are not excluded.

In a basic configuration, the proposed precharge device comprises just one switching element, which in particular may be embodied as an electronic switch. In such a case, a current can only flow in one direction. In alternative embodiment, current is enabled to flow in both directions.

For example, in a beneficial embodiment, the precharge device comprises a first switching element between the second end of the first coil and the second end of the second coil, which is embodied as a first electronic switch, wherein an input side of the first electronic switch is connected to the second end of the first coil and an output side of the first electronic switch is connected to the second end of the second coil and a second switching element between the second end of the first coil and the second end of the second coil, which is embodied as a second electronic switch, wherein the input side of the second electronic switch is connected to the second end of the second coil and the output side of the second electronic switch is connected to the second end of the first coil.

In such a case, the first switching element allows current flow in one direction, and the second switching element allows current flow in the other direction. The direction from the input side to the output side indicates the direction of a forward current in an electronic switch in the above context.

In an alternative beneficial embodiment, the precharge device comprises a single switching element between the second end of the first coil and the second end of the second coil, which is embodied as an electronic switch, a third diode between the second end of the first coil and an input side of the electronic switch with its forward direction from the second end of the first coil to the input side of the electronic switch, a fourth diode between the second end of the second coil and an output side of the electronic switch with its forward direction from the output side of the electronic switch to the second end of the second coil, a fifth diode between the second end of the second coil and the input side of the electronic switch with its forward direction from the second end of the second coil to the input side of the electronic switch and a sixth diode between the second end of the first coil and the output side of the electronic switch with its forward direction from the output side of the electronic switch to the second end of the first coil.

In this case, the current is redirected by the diodes so that the single switching element draws current in just on direction in its on-state independent of whether current flows through the precharge device (strictly speaking through its terminals) in one or the other direction. In particular, the use of just one switching element is advantageous in view of the price of the precharge device because one additional switching element is more expensive than four diodes. Again, the direction from the input side to the output side indicates the direction of a forward current in an electronic switch.

In the above context, it is also of advantage if the first positive terminal and the first ground terminal form a first port of the precharge device and the second positive terminal and the second ground terminal form a second port of the precharge device, wherein the electric behavior of the precharge device is symmetric with regards to the first port and the second port. So, in this embodiment the proposed precharge device is fully symmetric with regards to its electrical function. Hence, energy may equally flow from the first port to the second port or vice versa. Thus, both a source or a load may be connected to the first or second port without difference. The precharge device is also able to perfectly handle situations where the roles of circuits connected to the first and second port change from source to load and vice versa.

It is also of advantage if the first positive terminal and the first ground terminal form a first port of the precharge device and the second positive terminal and the second ground terminal form a second port of the precharge device, wherein a circuitry of the precharge device is symmetric with regards to the first port and the second port. So, in this embodiment the proposed precharge device is fully symmetric with regards to its structure and accordingly also with regards to its electrical function. Thus, the aforementioned advantages equally apply.

Advantageously, the precharge device can comprise a first current measuring device for measuring the first current and a second current measuring device for measuring the second current, and the control can comprise a summing device for providing the total current by summing the first current and the second current and a hysteresis switch, wherein a value representing the total current is fed into the hysteresis switch as an input, wherein the output of the hysteresis switch is fed to the at least one switching element between the first coil and the second coil and wherein a hysteresis of the hysteresis switch is formed by the first threshold value and the second threshold value.

In this way, a control with just a low number of parts or modules and with just low technical complexity is provided. Basically, the switching element(s) are switched on by the hysteresis switch if the total current drops below a first threshold value and switched off if the total current or its absolute value rises above a higher second threshold value. For example, the hysteresis switch can be embodied or comprise a RS Flip-Flop, a Schmitt-Trigger, a numeric control and/or a microcontroller.

In a very advantageous embodiment, the summing device in addition provides the absolute value of the total current and a value representing the absolute value of the total current is fed into the hysteresis switch. In this way, symmetric behavior of the proposed precharge device is supported because the input of the hysteresis switch does not depend on a particular current direction.

Advantageously, the magnetic core has a ring-shaped section and an additional leg, which creates two annular sub sections in the ring-shaped section and which comprises an air gap in the additional leg or the magnetic core is embodied as a single open ring with an air gap or the magnetic core is embodied as a single closed ring with distributed air gaps.

By these measures, energy can be stored in the magnetic circuit and saturation of the magnetic core within the operating range of the proposed discharge device can be avoided.

Preferably, the proposed discharge device comprises a first serial connection of a first resistor and a third capacitor connecting the first and the second end of the first coil and/or a second serial connection of a second resistor and a fourth capacitor connecting the first and the second end of the second coil.

In this way, a snubber circuit for overvoltage protection of the first and second coil is provided.

Advantageously, an electromagnetic coupling of the first coil and the second coil is below 0.99. In particular, the electromagnetic coupling of the first coil and the second coil can range from 0.80 to 0.99. In this way, a substantial amount of energy is transferred from the DC grid to the load side even when the switching element is open. An electromagnetic coupling of above 0.80 is of advantage because thermal stress on components is not too big then. Lower values in particular relate to DC grids with low or without inductance. Although, a high coupling factor is beneficial in view of efficiency, it should stay well below 1.00 because some energy should be stored within the precharge device for a proper function of the same.

BRIEF DESCRIPTION OF DRAWINGS

The invention now is described in more detail hereinafter with reference to particular embodiments, which the invention however is not limited to.

FIG. 2 shows the current flow in the precharge device when the switching element is on;

DETAILED DESCRIPTION

Generally, same parts or similar parts are denoted with the same/similar names and reference signs. The features disclosed in the description apply to parts with the same/similar names respectively reference signs. Indicating the orientation and relative position is related to the associated figure, and indication of the orientation and/or relative position has to be amended in different figures accordingly as the case may be.

Figure 1:
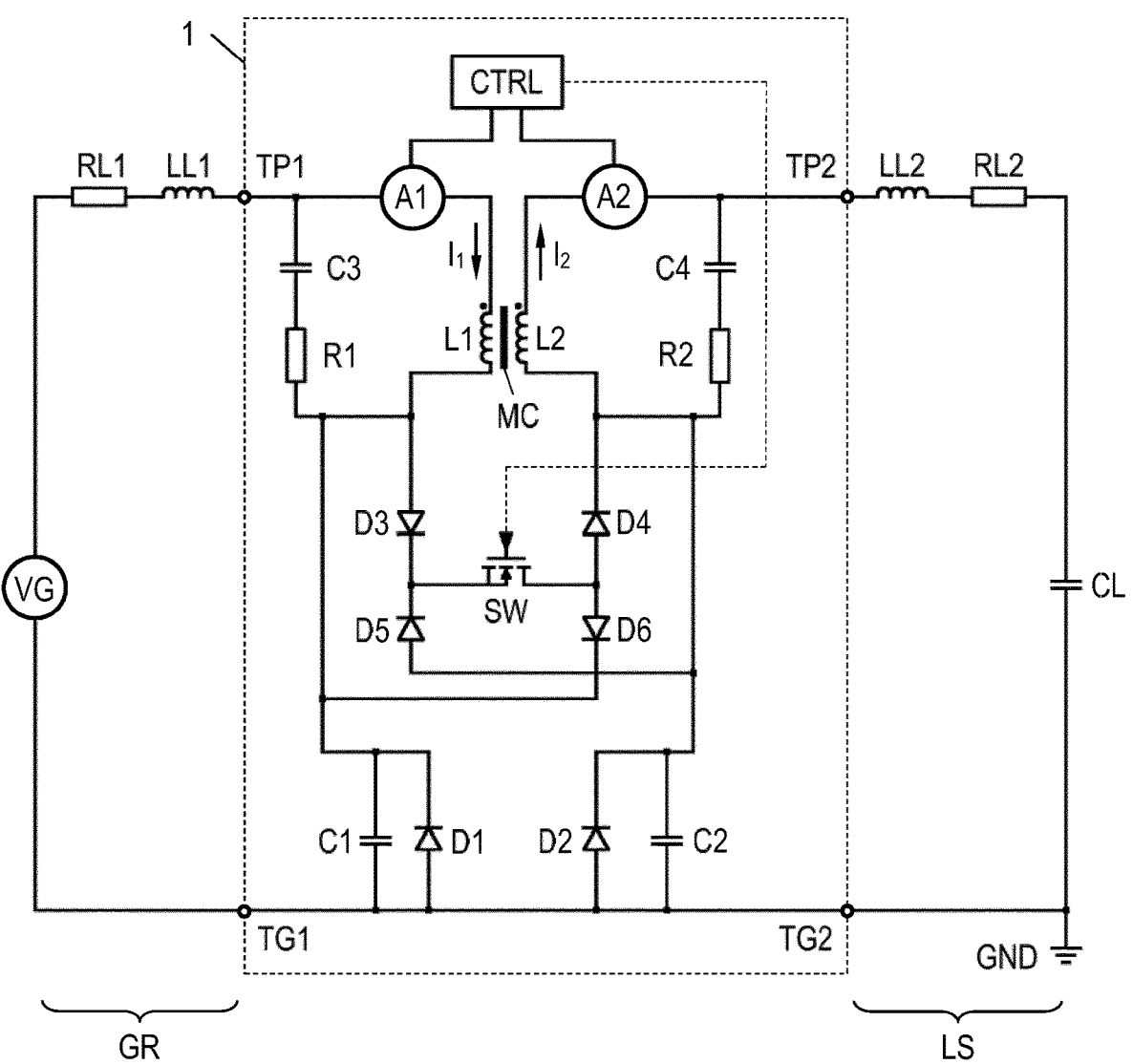
FIG. 1 shows an arrangement with an exemplary precharge device being connected to a DC grid and a load side.

FIG. 1 shows an arrangement, comprising a DC-grid GR, a precharge device 1 connected to the DC-grid GR and a load side LS connected to the precharge device 1. In detail, the precharge device 1 comprises a first positive terminal TP1, a second positive terminal TP2, a first ground terminal TG1, a second ground terminal TG2 connected to the first ground terminal TG1, a switching element SW, a magnetic core MC, which is ring-shaped or at least comprises a ring-shaped section, and a first coil L1 wound around the magnetic core MC as well as a second coil L2 wound around the magnetic core MC. A first end of the first coil L1 is connected to the first positive terminal TP1, and a first end of the second coil L2 is connected to the second positive terminal TP2. Moreover, the second end of the first coil L1 is connected to the second end of the second coil L2 via the at least one switching element SW. The first coil L1 and the second coil L2 are negatively coupled what means that a first current $I_1$ flowing into the first end of the first coil L1 and a second current $I_2$ flowing out of the first end of the second coil L2 generate magnetic fluxes $F_1$, $F_2$ in opposite direction senses in the ring-shaped magnetic core MC or in the ring-shaped section of the magnetic core MC (see FIGS. 4 to 6). In addition, the precharge device 1 comprises a first capacitor C1 between the second end of the first coil L1 and the first ground terminal TG1 and a second capacitor C2 between the second end of the second coil L2 and the second ground terminal TG2, a first diode D1 between the second end of the first coil L1 and the first ground terminal TG1 as well as a second diode D2 between the second end of the second coil L2 and the second ground terminal TG2. The forward direction of the first diode D1 is from the first ground terminal TG1 to the second end of the first coil L1, and the forward direction of the second diode D2 is from the second ground terminal TG2 to the second end of the second coil L2. Further on, the precharge device 1 comprises a control CTRL for turning the at least one switching element SW on if a total current $I_T$, which is the sum of the first current $I_1$ and the second current $I_2$, or the absolute value of the total current $I_T$ drops below a first threshold value $I_{TH1}$ and for turning the at least one switching element SW off if said total current $I_T$ or its absolute value rises above a higher second threshold value $I_{TH2}$ (do also see FIG. 7 in this context).

Figure 6:
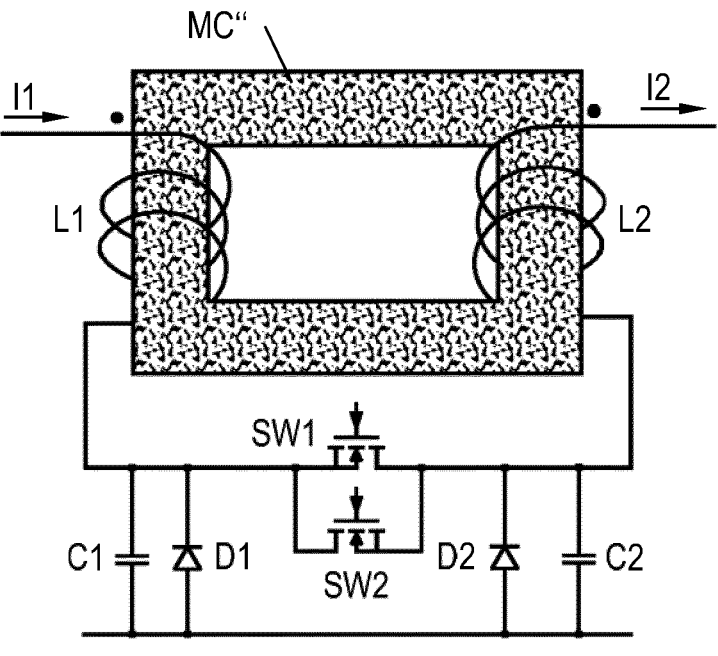
FIG. 6 shows an exemplary embodiment of a precharge device with a magnetic core, which is embodied as a single closed ring with distributed air gaps.

In detail, the precharge device 1 in this example comprises a single switching element SW between the second end of the first coil L1 and the second end of the second coil L2, which is embodied as an electronic switch. In addition, it comprises four diodes D3 . . . D6. A third diode D3 is arranged between the second end of the first coil L1 and an input side of the electronic switch SW with its forward direction from the second end of the first coil L1 to the input side of the electronic switch SW. A fourth diode D4 is arranged between the second end of the second coil L2 and an output side of the electronic switch SW with its forward direction from the output side of the electronic switch SW to the second end of the second coil L2. A fifth diode D5 is arranged between the second end of the second coil L2 and the input side of the electronic switch SW with its forward direction from the second end of the second coil L2 to the input side of the electronic switch SW. Finally, a sixth diode D6 is arranged between the second end of the first coil L1 and the output side of the electronic switch SW with its forward direction from the output side of the electronic switch SW to the second end of the first coil L1. This is an advantageous embodiment, however, it is also possible that there are two switching elements, which for example is shown in FIG. 6.

Moreover, the precharge device 1 comprises a first current measuring device A1 for measuring the first current $I_1$ and a second current measuring device A2 for measuring the second current $I_2$, whose measurements are fed into the control CTRL.

Finally, the precharge device 1 comprises an optional first serial connection of a first resistor R1 and a third capacitor C3 connecting the first and the second end of the first coil L1 and an optional second serial connection of a second resistor R2 and a fourth capacitor C4 connecting the first and the second end of the second coil L2. The series connections form snubber circuits and thus an overvoltage protection for the first coil L1 and the second coil L2. However, capacitance of capacitors C3, C4 does not have to be very high because of high coupling factor of the coils L1, L2. In usual cases, a capacitance of some nano farads is considered to be sufficient, which however is the higher the lower the coupling of the coils L1 and L2 is.

In FIG. 1, the precharge device 1 is connected to the DC-grid GR by use of the first positive terminal TP1 and the first ground terminal TG1. Concretely, the DC-grid GR with its positive polarity is connected to the first positive terminal TP1 of the precharge device 1 and with its ground potential to the first ground terminal TG1 of the precharge device 1. The DC-grid GR in this example comprises a grid voltage source VG, a grid line resistance RL1 and a grid line inductance LL1.

Moreover, the precharge device 1 is connected to the load side LS by use of the second positive terminal TP2 and the second ground terminal TG2. In detail, the load side LS with its positive polarity is connected to the second positive terminal TP2 of the precharge device 1 and with its ground potential to the second ground terminal TG2 of the precharge device 1. The load side LS in this example comprises a load capacitor CL, a load line resistance RL2 and a load line inductance LL2. The load line resistance RL2 and the load line inductance LL2 usually are no discrete elements. So, in even more detail, the load capacitor CL with its positive polarity is connected to the second positive terminal TP2 of the precharge device 1 and with its ground potential to the second ground terminal TG2 of the precharge device 1. If there are discrete elements between the load capacitor CL, the second positive terminal TP2 and the second ground terminal TG2, the term "connected" may be replaced by "coupled" in the aforementioned sentence. In any case, a current flowing through the load capacitor CL also flows over the precharge device 1.

Figure 2:
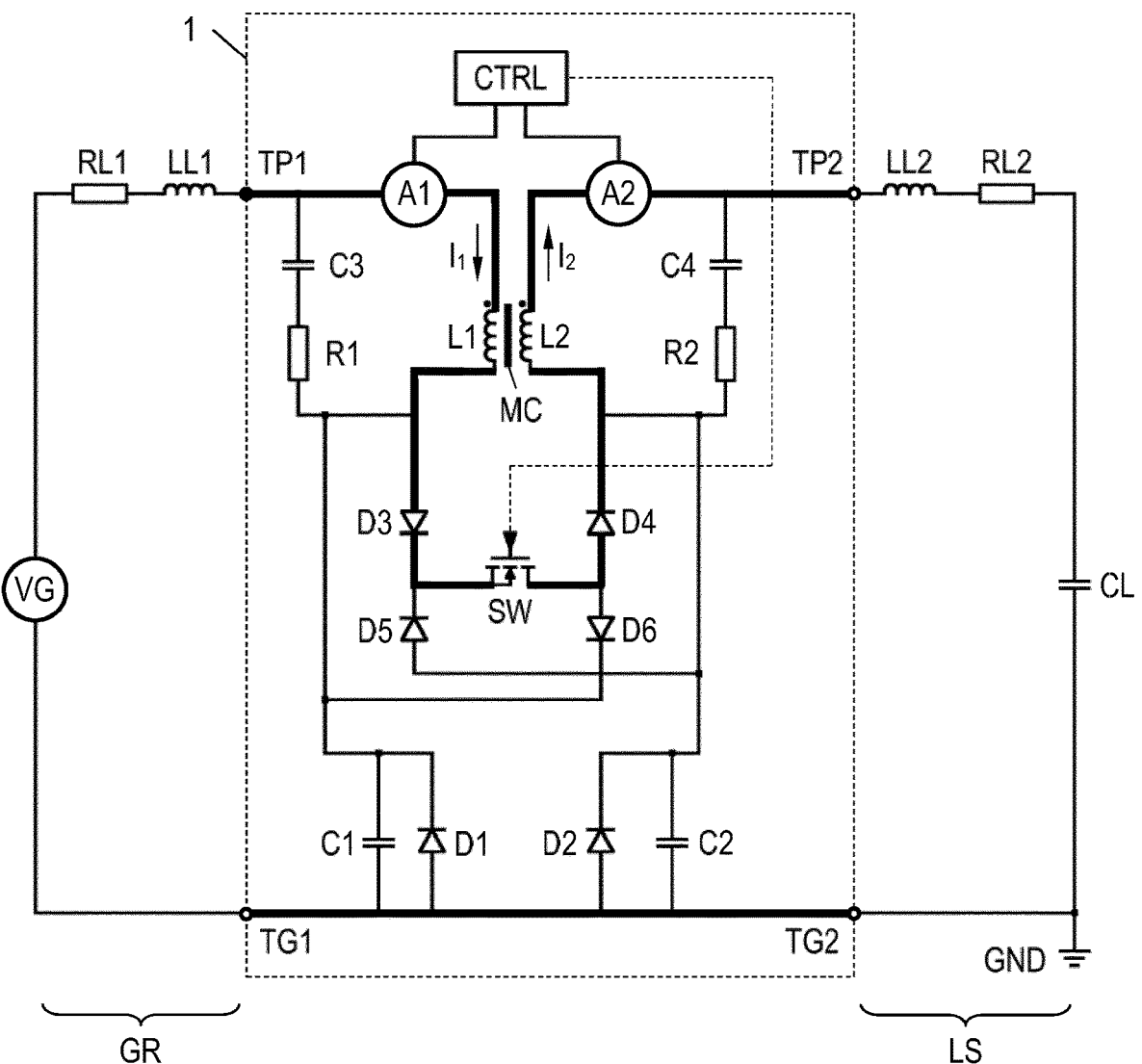

FIG. 2 shows the arrangement of FIG. 1 in a first state, in which the switching element SW is closed. Accordingly, a first current $I_1$ flowing from the first positive terminal TP1 through the first coil L1, may further flow over the third diode D3, the switching element SW, the fourth diode D4, the second coil L2 and over the second positive terminal TP2. On the ground side, the current may directly flow from the first ground terminal TG1 to the second ground terminal TG2. The current flow is indicated by bold lines in FIG. 2. It should be noted that the bold lines just indicate a main current flow and there may also be (minor) current flows over the other elements of the precharge device 1 as the case may be.

Figure 3:
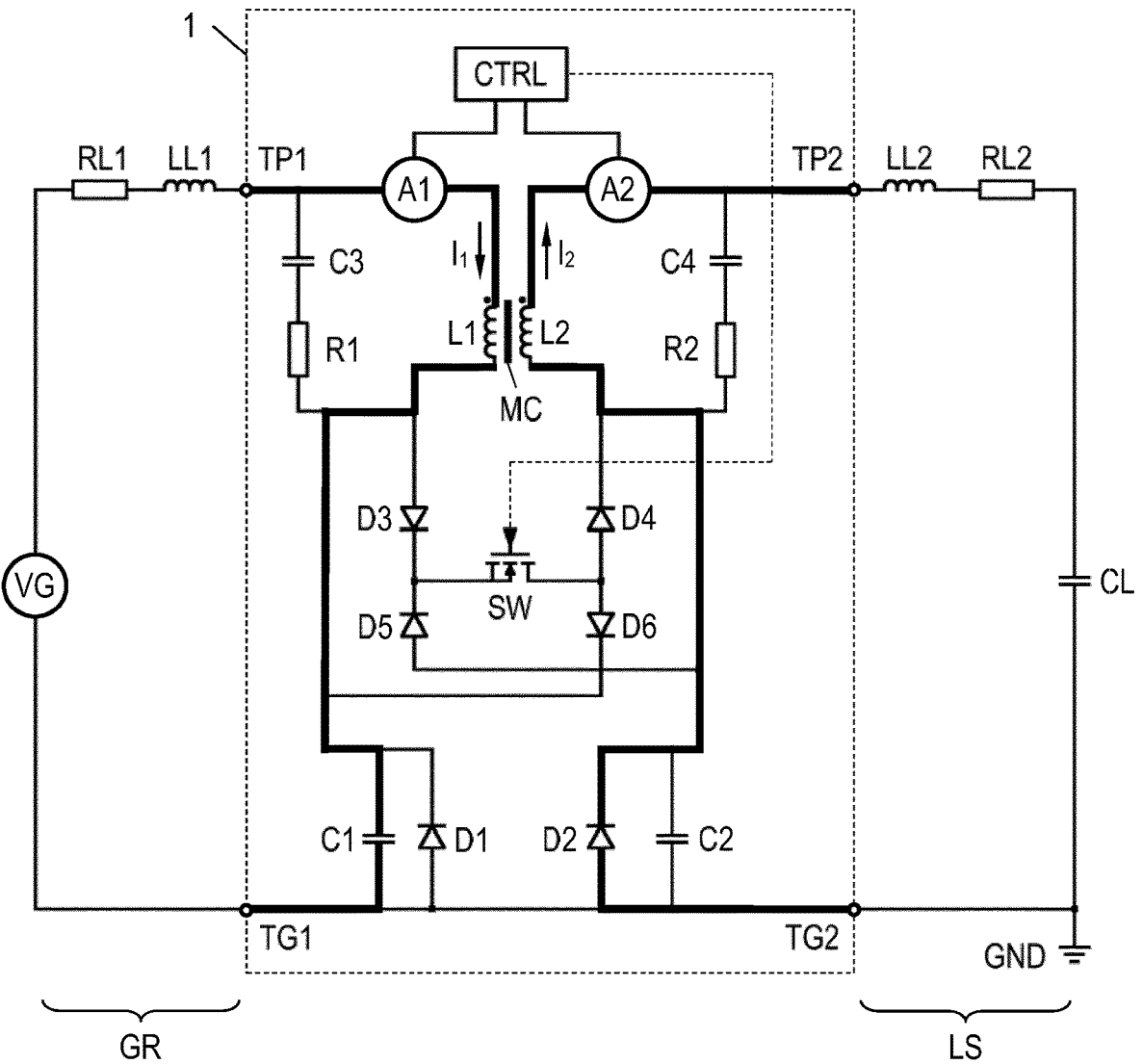
FIG. 3 shows the current flow in the precharge device when the switching element is off.

FIG. 3 shows the arrangement of FIG. 1 in a second state, in which the switching element SW is open. Accordingly, a first current $I_1$ flowing from the first positive terminal TP1 through the first coil L1 cannot pass to the load side LS. Instead, such a current $I_1$ flows through the first capacitor C1 and the first ground terminal TG1. Equivalently, a second current $I_2$ flowing over the second positive terminal TP2 and the second ground terminal TG2 cannot pass to the DC grid GR. Instead, such a current $I_2$ flows through the second diode D2. The current flow again is indicated by bold lines in FIG. 3. It should be noted again that the bold lines just indicate main current flows and there may also be (minor) current flows over the other elements of the precharge device 1 as the case may be. It should also be noted that the second current $I_2$ in this state is caused by the first current $I_1$ and the magnetic coupling between the first coil L1 and the second coil L2.

Figure 4:
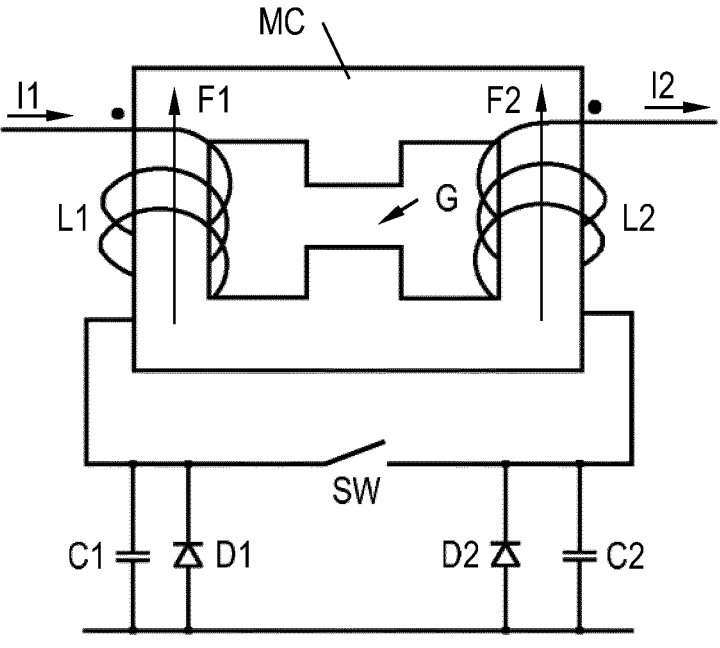
FIG. 4 shows an exemplary embodiment of a precharge device with a magnetic core having a ring-shaped section and an additional leg with an air gap.

FIG. 4 shows a first example, how the magnetic core MC may look like. In detail, FIG. 4 shows a reduced version of FIG. 1 just including necessary parts, wherein the switching element SW is symbolically depicted and may lead a current in both directions. Concretely, FIG. 4 in addition shows the first capacitor C1, the first diode D1, the second capacitor C2 and the second diode D2.

In the example of FIG. 4, the magnetic core MC has a ring-shaped section and an additional leg, which creates two annular sub sections in the ring-shaped section and which comprises an air gap G in the additional leg. FIG. 4 explicitly shows that a first current $I_1$ flowing into the first end of the first coil L1 and a second current $I_2$ flowing out of the first end of the second coil L2 generate magnetic fluxes F1, F2 in opposite direction senses in the in the ring-shaped section of the magnetic core MC.

Figure 5:
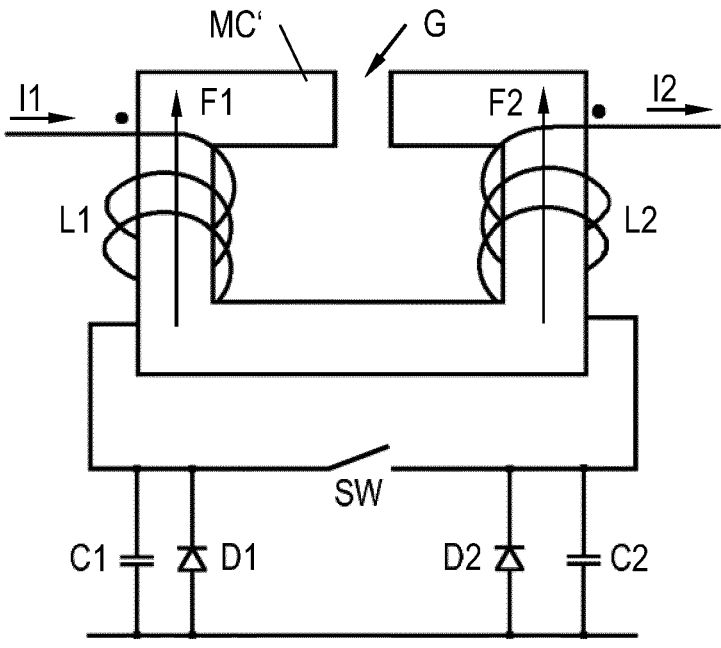
FIG. 5 shows an exemplary embodiment of a precharge device with a magnetic core, which is embodied as a single open ring with an air gap.

FIG. 5 shows a second example of a magnetic core MC'. Basically, FIG. 5 equals FIG. 4 except of the magnetic core MC', which is embodied as a single open ring with an air gap G in this example.

FIG. 6 shows a third example of a magnetic core MC", which is embodied as a single closed ring with distributed air gaps. In addition, FIG. 6 instead of a symbolized switching element SW shows an embodiment with two electronic switches. In detail, a first switching element SW1 between the second end of the first coil L1 and the second end of the second coil L2 is embodied as a first electronic switch, wherein an input side of the first electronic switch SW1 is connected to the second end of the first coil L1 and an output side of the first electronic switch SW1 is connected to the second end of the second coil L2. Moreover, a second switching element SW2 between the second end of the first coil L1 and the second end of the second coil L2, which is embodied as a second electronic switch SW2, wherein the input side of the second electronic switch SW2 is connected to the second end of the second coil L2 and the output side of the second electronic switch SW2 is connected to the second end of the first coil L1.

It should be noted at this point that the switching arrangement of FIGS. 1 to 3 with the switching element SW and the four diodes D3 . . . D6, a bidirectional switching element SW like it is depicted in FIGS. 4 and 5 and the switching arrangement of FIG. 6 with the two antiparallel switching elements SW1, SW2 provide equal functionality with regards to the proposed precharge device 1. That is why one of the switching arrangements may be replaced by another one without a substantial change of function. However, one should also note that the use of just one switching element SW is advantageous in view of the price of the precharge device 1 because the price for one additional switching element SW2 easily exceeds the price of the four diodes D3 . . . D6.

Similarly, the magnetic cores MC . . . MC" provide similar function, too. That is why one of the magnetic cores MC . . . MC" may be replaced by another one without a substantial change of function.

Figure 7:
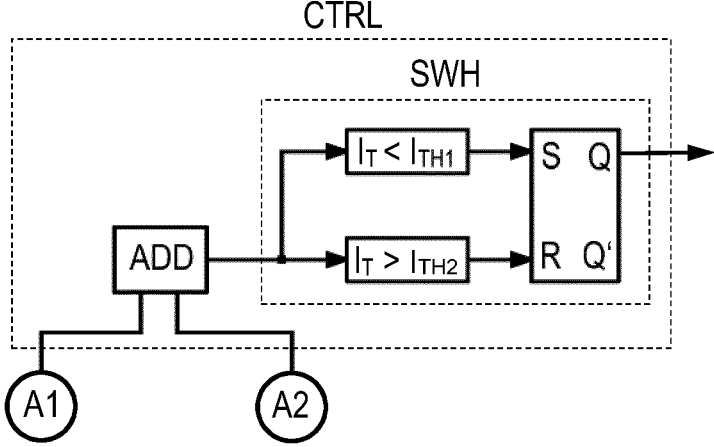
FIG. 7 shows a schematic view of an exemplary control for the precharge device and FIG. 8 shows exemplary graphs of the switching state of the switching element, the first current, the second current and the total current.

FIG. 7 now shows how the control CTRL may look like. In detail, the control CTRL comprises a summing device ADD for providing the total current $I_T$ by summing the first current $I_1$ and the second current $I_2$ and a hysteresis switch SWH. Generally, a value representing the total current $I_T$ is fed into the hysteresis switch SWH as an input, and the output of the hysteresis switch SWH is fed to the at least one switching element SW, SW1, SW2 between the first coil L1 and the second coil L2. A hysteresis of the hysteresis switch SWH is formed by the first threshold value $I_{TH1}$ and the second threshold value $I_{TH2}$.

In detail, the hysteresis switch SWH of FIG. 7 comprises two threshold switches, wherein a first threshold switch (in FIG. 7 the upper one) is activated when the total current $I_T$ is below the first threshold value $I_{TH1}$ and wherein a second threshold switch (in FIG. 7 the lower one) is activated when the total current $I_T$ is above the second threshold value $I_{TH2}$. The output of the first threshold switch is fed into the set input S of a RS flip-flop, and the output of the second threshold switch is fed into the reset input R of said RS flip-flop. The output Q is fed to the switching element(s) SW, SW1, SW2. This is true for a positive logic. However, in case of a negative logic, the inversed output Q' is fed to the switching element(s) SW, SW1, SW2.

While the embodiment of the hysteresis switch SWH shown in FIG. 7 is advantageous, other embodiments are possible as well. For example the hysteresis switch SWH may be embodied as a Schmitt-Trigger or may also be based numerically, that means that the function of the hysteresis switch SWH may be provided by a numeric control or a microcontroller.

In a preferred embodiment, the summing device ADD in addition can provide the absolute value of the total current $I_T$, wherein a value representing the absolute value of the total current $I_T$ is fed into the hysteresis switch SWH. In this way, the precharge device 1 behaves symmetrically.

Symmetry can also be defined with regards to ports of the precharge device 1. For example, the first positive terminal TP1 and the first ground terminal TG1 can form a first port of the precharge device 1 and the second positive terminal TP2 and the second ground terminal TG2 can form a second port of the precharge device 1, wherein the electric behavior of the precharge device 1 is symmetric with regards to the first port and the second port. So the function of the precharge device 1 seen from the first port equals the function seen from the second port. In the above examples, moreover a circuitry of the precharge device 1 is symmetric with regards to the first port and the second port. That means that the precharge device 1 seen from the first port looks the same as seen from the second port (and thus provides symmetric electric functions). Although this is advantageous, the precharge device 1 may also function and/or may also be designed non-symmetric.

Advantageously, an electromagnetic coupling of the first coil L1 and the second coil L2 is below 0.99. In particular, the electromagnetic coupling of the first coil L1 and the second coil L2 can range from 0.80 to 0.99. In this way, a substantial amount of energy is transferred from the DC grid GR to the load side LS even when the switching element SW is open. An electromagnetic coupling of above 0.80 is of advantage because thermal stress on components is not too big then. As a rule of thumb, the coupling of the first coil L1 and the second coil L2 is the lower the lower the grid line inductance LL1 is. It should also be noted in this context that the function of the air gap(s) G is not just avoiding saturation of the magnetic core MC . . . MC" but also to store energy in the magnetic circuit.

Figure 8:
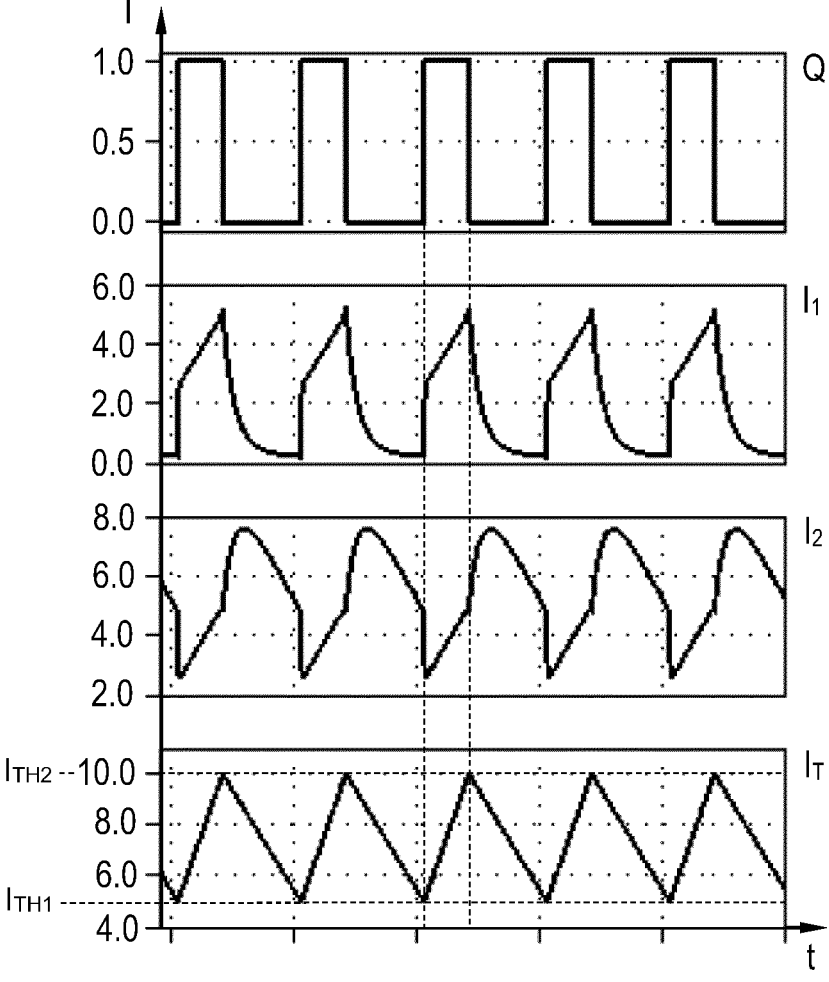

The function of the precharge device 1 is now explained in more detail by additional reference to FIG. 8. It should be noted at this point that reference is just made to a single switching element SW, but the technical teaching equally applies to embodiments with two switching elements SW1, SW2.

FIG. 8 shows four signals over time t, in detail the output Q, which is indicative of the switching status of the switching element(s) SW, SW1, SW2, the first current $I_1$, the second current $I_2$ and the total current $I_T$. Note that the scaling of Q is normalized and note the different scaling for the first current $I_1$, the second current $I_2$ and the total current $I_T$.

In a first point in time, the output Q and thus the switching element SW are off. Hence, the first current $I_1$ flows over the first capacitor C1 according to FIG. 3 and charges the same. The second current $I_2$ flows over the second diode D2. The total current $I_T$ basically linearly drops to the first threshold value $I_{TH1}$ over time what then causes the output Q and thus the switching element SW to be switched on once the total current $I_T$ has reached the first threshold value $I_{TH1}$.

Then, the first current $I_1$ and the second current $I_2$ flow over the switching element SW according to FIG. 2. In this operating state, energy is transferred from the DC grid GR to the load side LS via the switching element SW. In addition, the first capacitor C1 is discharged again. In this section, the first current $I_1$ basically equals the second current $I_2$ minus the discharge current of the first capacitor C1, which however is very small and basically negligible (note that the capacitance of the capacitors C1, C2 may be in the range of just some nano farads). The total current $I_T$ basically linearly rises up to the second threshold value $I_{TH2}$ now over time what then causes the output Q and thus the switching element SW to be switched off again once the total current $I_T$ has reached the second threshold value $I_{TH2}$.

Then, the first current $I_1$ flows over the first capacitor C1 charging the same, and the second current $I_2$ flows over the second diode D2 again. In this operating state, energy is transferred from the DC grid GR to the load side LS via the transformer formed by the first coil L1, the second coil L2 and the magnetic core MC . . . MC". In other words, the second current $I_2$ is caused by the first current $I_1$ and the magnetic coupling of the first coil L1 and the second coil L2 in this operating state. Energy stored in the grid line inductance LL1 and the first coil L1 add up and lead to a voltage increase on the secondary side and thus to an overshooting second current $I_2$. The total current $I_T$ basically linearly drops to the first threshold value $I_{TH1}$ over time what then causes the output Q and thus the switching element SW to be switched on again once the total current $I_T$ has reached the first threshold value $I_{TH1}$.

This sequence periodically continues, and the total current $I_T$ oscillates between the first threshold value $I_{TH1}$ and the second threshold value $I_{TH2}$. So, the total current $I_T$ can be kept in the range between first threshold value $I_{TH1}$ and the second threshold value $I_{TH2}$ by the proposed control method.

In both operating states, a substantial amount of energy is transferred from the DC grid GR to the load side LS. In the second operating state when the switching element SW is open, the amount of energy depends on the coupling of the first coil L1 and the second coil L2. As said, the coupling factor can reach up to 0.99 so that in this case 99% of the energy is transferred from the DC grid GR to the load side LS. Hence, there is no need for an MOV in the precharge device 1 for common values of the grid line inductance LL1. If the grid line inductance LL1 reaches up to extraordinary values, the capacitance of the first capacitor C1 (and the second capacitor C2 as the case may be) should be increased and the use of a MOV, which would be switched in parallel with the first capacitor C1 (and the second capacitor C2 as the case may be), could become useful to avoid overcharging.

Although, a high coupling factor is beneficial in view of efficiency, it should stay well below 1.00 because some energy should be stored within the precharge device 1 for a proper function of the same.

Note that the duty cycle and the frequency of the signal present at output Q can vary depending on the threshold values $I_{TH1}$ and $I_{TH2}$ and on the operating state of the precharge device 1, in particular in transient situations like switch on and off of power.

In a nutshell, the proposed precharge device 1 avoids excessive inrush currents with just a low number of active components and at a high efficiency. In a basic configuration, there is just one electronic switch SW. The control of the proposed precharge device 1 can be based on simple rules. Moreover, the proposed precharge 1 device itself does not cause (substantial) inrush currents because it does not need filtering capacitors. It without limitation can be used in cases where are substantial inductors on the grid side (source side). Additionally, there is no need for a special design of snubber circuits with MOVs under normal circumstances. And one further outstanding advantage is that the special design of the proposed precharge device 1 allows to control current in both directions and even allows symmetric function and/or structure. Accordingly, it does not matter whether the first port or the second port is connected to the DC grid GR and whether the first port or the second port is connected to the load side LS. It does also not matter when roles of DC grid GR and the load side LS change, which is especially important in structures with distributed loads and energy sources like DC microgrids. In such a case, a particular part of the DC microgrid may generate power, e.g. by means of a solar module, and in another state may draw power, e.g. in night. The proposed precharge device 1 because of its characteristics qualifies for a universal junction in DC applications and avoids excessive inrush currents from wherever they may come.

It is noted that the invention is not limited to the embodiments disclosed hereinbefore, but combinations of the different variants are possible. In reality, the precharge device 1 and the arrangement with the DC grid GR and the load side LS may have more or less parts than shown in the figures. Moreover, the description may comprise subject matter of further independent inventions.

It should also be noted that the term "comprising" does not exclude other elements and the use of articles "a" or "an" does not exclude a plurality. Also elements described in association with different embodiments may be combined. It should also be noted that reference signs in the claims should not be construed as limiting the scope of the claims.

LIST OF REFERENCE NUMERALS

1 current limiting device
TP1, TP2 positive terminal
TG1, TG2 ground terminal
SW, SW1, SW2 switching element
L1, L2 coil
C1 . . . C4 capacitor
D1 . . . D6 diode
R1, R2 resistor
GND ground
MC . . . MC" magnetic core
G air gap
GR DC grid
VG grid voltage source
RL1 grid line resistance
LL1 grid line inductance
LS load side
CL load capacitor
RL2 load line resistance
LL2 load line inductance
CTRL control
A1, A2 current measuring device
ADD summing device
SWH hysteresis switch
Q, Q' output RS flip flop
R reset input RS flip flop
S set input RS flip flop
t time
I current $I_1$ first current
$I_2$ second current
$I_T$ total current
$I_{TH1}$, $I_{TH1}$ threshold value
$F_1$, $F_2$ magnetic flux

The invention claimed is:

1. A precharge device, comprising:
a first positive terminal;
a second positive terminal;
a first ground terminal and a second ground terminal connected to the first ground terminal, the first ground terminal and the second ground terminal configured to be connected to a ground potential;
at least one switching element;
a magnetic core, which is ring-shaped or at least comprises a ring-shaped section;
a first coil wound around the magnetic core; and
a second coil wound around the magnetic core,
wherein a first end of the first coil is connected to the first positive terminal,
wherein a first end of the second coil is connected to the second positive terminal,
wherein a second end of the first coil is connected to a second end of the second coil via the at least one switching element,
wherein the precharge device is configured such that a first current flowing into the first end of the first coil and a second current flowing out of the first end of the second coil generates magnetic fluxes in opposite direction senses in the ring-shaped magnetic core or in the ring-shaped section of the magnetic core, and
wherein the precharge device further comprises:
a first capacitor between the second end of the first coil and the first ground terminal; and
a second capacitor between the second end of the second coil and the second ground terminal;
a first diode between the second end of the first coil and the first ground terminal with its forward direction from the first ground terminal to the second end of the first coil; and
a second diode between the second end of the second coil and the second ground terminal with its forward direction from the second ground terminal to the second end of the second coil; and
a control configured to:
turn the at least one switching element on if a total current, which is the sum of the first current and the second current, or the absolute value of the total current drops below a first threshold value, and
turn the at least one switching element off if the total current or its absolute value rises above a second threshold value that is higher than the first threshold value.

2. The precharge device as claimed in claim 1, wherein the at least one switching element comprises:
a first switching element between the second end of the first coil and the second end of the second coil, the first switching element being a first electronic switch,
wherein an input side of the first electronic switch is connected to the second end of the first coil and an output side of the first electronic switch is connected to the second end of the second coil; and
a second switching element between the second end of the first coil and the second end of the second coil, the second switching element being a second electronic switch, wherein the input side of the second electronic switch is connected to the second end of the second coil and the output side of the second electronic switch is connected to the second end of the first coil.

3. The precharge device as claimed in claim 1, wherein the at least one switching element comprises a single switching element between the second end of the first coil and the second end of the second coil, the single switching element being an electronic switch, wherein the precharge device further comprises:

a third diode between the second end of the first coil and an input side of the electronic switch with its forward direction from the second end of the first coil to the input side of the electronic switch;

a fourth diode between the second end of the second coil and an output side of the electronic switch with its forward direction from the output side of the electronic switch to the second end of the second coil;

a fifth diode between the second end of the second coil and the input side of the electronic switch with its forward direction from the second end of the second coil to the input side of the electronic switch; and a sixth diode between the second end of the first coil and the output side of the electronic switch with its forward direction from the output side of the electronic switch to the second end of the first coil.

4. The precharge device as claimed in claim 1, wherein the precharge device further comprises:

a first current measuring device configured to measure the first current; and a second current measuring device configured to measure the second current, and wherein the control comprises:

a summing device for providing configured to provide the total current by summing the first current and the second current; and a hysteresis switch, wherein a value representing the total current is configured to be fed into the hysteresis switch as an input, wherein an output of the hysteresis switch is configured to be fed to the at least one switching element between the first coil and the second coil, and wherein a hysteresis of the hysteresis switch is configured to be formed by the first threshold value and the second threshold value.

5. The precharge device as claimed in claim 4, wherein the summing device is further configured to provide an absolute value of the total current and a value representing the absolute value of the total current is configured to be fed into the hysteresis switch.

6. The precharge device as claimed in claim 1, wherein that the magnetic core comprises the ring-shaped section and further comprises an additional leg, which creates two annular sub sections in the ring-shaped section and which comprises an air gap in the additional leg, or the magnetic core is embodied as a single open ring with an air gap, or the magnetic core is embodied as a single closed ring with distributed air gaps.

7. The precharge device as claimed in claim 1, wherein the precharge device further comprises a first serial connection of a first resistor and a third capacitor connecting the first end of the first coil and the second end of the first coil; and/or a second serial connection of a second resistor and a fourth capacitor connecting the first end of the second coil and the second end of the second coil.

8. The precharge device as claimed in claim 1, wherein an electromagnetic coupling of the first coil and the second coil is below 0.99.

9. The precharge device as claimed in claim 1, wherein that the first positive terminal and the first ground terminal form a first port of the precharge device and the second positive terminal and the second ground terminal form a second port of the precharge device, and wherein the electric behavior of the precharge device is symmetric with regards to the first port and the second port.

10. The precharge device as claimed in claim 1, wherein the first positive terminal and the first ground terminal form a first port of the precharge device and the second positive terminal and the second ground terminal form a second port of the precharge device, and wherein a circuitry of the precharge device is symmetric with regards to the first port and the second port.

11. An arrangement, comprising the precharge device as claimed in claim 1, a DC-grid with its positive polarity being connected to the first positive terminal of the precharge device and with its ground potential being connected to the first ground terminal of the precharge device and a load capacitor with its positive polarity being connected to the second positive terminal of the precharge device and with its ground potential being connected to the second ground terminal of the precharge device.

* * * * *